United States Patent [19]
Weideman

[11] Patent Number: 5,396,057
[45] Date of Patent: Mar. 7, 1995

[54] METHOD FOR OPTIMUM FOCUSING OF ELECTRO-OPTICAL SENSORS FOR TESTING PURPOSES WITH A HAAR MATRIX TRANSFORM

[75] Inventor: Dean L. Weideman, Lomita, Calif.

[73] Assignee: Northrop Grumman Corporation, Los Angeles, Calif.

[21] Appl. No.: 118,379

[22] Filed: Sep. 8, 1993

[51] Int. Cl.[6] ............................................. G01J 1/20
[52] U.S. Cl. ................................. 250/201.2; 382/43
[58] Field of Search ............... 250/201.2, 201.7, 203.2; 382/43; 348/353, 354, 355; 354/402, 421

[56] References Cited

U.S. PATENT DOCUMENTS

| | | |
|---|---|---|
| 3,981,443 | 9/1976 | Lynch et al. . |
| 4,242,733 | 12/1980 | Deal . |
| 4,242,734 | 12/1980 | Deal . |
| 4,261,043 | 4/1981 | Robinson et al. . |
| 4,306,143 | 12/1981 | Utagawa et al. ................. 250/201.7 |
| 4,843,413 | 6/1989 | Walther . |
| 4,965,443 | 10/1990 | Yamasaki et al. ................. 250/201.7 |
| 5,003,165 | 3/1991 | Sarfati et al. . |
| 5,073,964 | 12/1991 | Resnikoff . |
| 5,144,122 | 9/1992 | Danley et al. . |
| 5,295,203 | 3/1994 | Krause et al. ........................ 382/43 |

Primary Examiner—David C. Nelms
Assistant Examiner—Que T. Le
Attorney, Agent, or Firm—Terry J. Anderson; Karl J. Hoch, Jr.

[57] ABSTRACT

A method of optimizing the optical focus of an electro-optical sensor in preparation for accurately measuring an optical parameter thereof of the type including, but not limited to, dynamic range, modulation transfer function, minimum resolvable temperature difference and field of view, includes changing a focus of the sensor on a target image viewed by the sensor while obtaining successive output images produced by the sensor, constructing respective image vectors from respective ones of the output images, for each one of the image vectors transforming the image vector by transform to produce a transformed image vector of elements whose values correspond to spatial frequency content computing a sum of squares of elements of the transformed image vector to produce a focus metric and identifying the focus of the recorded image corresponding to the greatest focus metric as being the optimum focus.

8 Claims, 1 Drawing Sheet

METHOD FOR OPTIMUM FOCUSING OF ELECTRO-OPTICAL SENSORS FOR TESTING PURPOSES WITH A HAAR MATRIX TRANSFORM

BACKGROUND OF THE INVENTION

1. Technical Field

The invention is related to a method of using test equipment for obtaining an optimum focus of an image viewed by an electro-optic sensor system under test.

2. Background Art

Electro-optic sensors such as FLIR sensors (forward looking infrared sensors typically include an infrared detector plane consisting of an array of infrared-detecting diodes in an integrated circuit and an optical system constituting an assembly of lenses and filters for directing light from a field of view onto the array.

It is very important that such devices be accurately characterized upon completion of their manufacture before they are used in the field. Typically, a great investment must be made in post-production test equipment to test electro-optic sensors. Such test equipment measure numerous system parameters such as dynamic range, modulation transfer function, minimum resolvable temperature difference and field of view. Before performing these tests, the operating point of the sensor must be determined. This is done by optimizing the sensor's contrast, brightness and focus relative to some test image viewed by the sensor. Locating best focus is critical to achieving accurate results for tests such as those mentioned above. Best focus is traditionally determined by viewing the video display of a resolution chart in the field of view of the sensor while manually varying the focus of the sensor until the human operator observes that an optimum sharpness has been achieved. This is a subjective process. Determination of best focus by this method may vary from test to test and observer to observer. What is needed is a purely objective way of determining the focal length of an electro-optic sensor under test.

SUMMARY OF THE DISCLOSURE

The invention is a method of testing an electro-optic sensor by making a purely objective determination of the sensor's best focus. The sensor views an image on a target plane at some distance from the sensor. In accordance with the invention, an output image of the sensor under test is recorded at each one of incrementally increasing (or decreasing) focusing control positions or (alternatively) sensor-to-target plane distances. For each such output image, a focusing metric, a parameter which indicates the state or quality of the sensor's focus, is computed from the image using image processing techniques. The focusing metrics of all the images are compared, and the one image with the highest focusing metric is the one most in focus of all the recorded images. The best focus of the sensor is then identified as the focus control position prevailing at the time of recording of the one image. The focusing metric is computed by forming an image vector of ordered pixels in the image, transforming that vector with a Haar matrix to produce a transformed vector, discarding the zero-order (D.C.) element of the transformed vector and then computing the sum of the squares of the remaining elements of the transformed vector.

BRIEF DESCRIPTION OF THE DRAWING

THE FIGURE is a block flow diagram illustrating the testing method of the invention.

DETAILED DESCRIPTION OF THE PREFERRED EMBODIMENT

Figure 1:
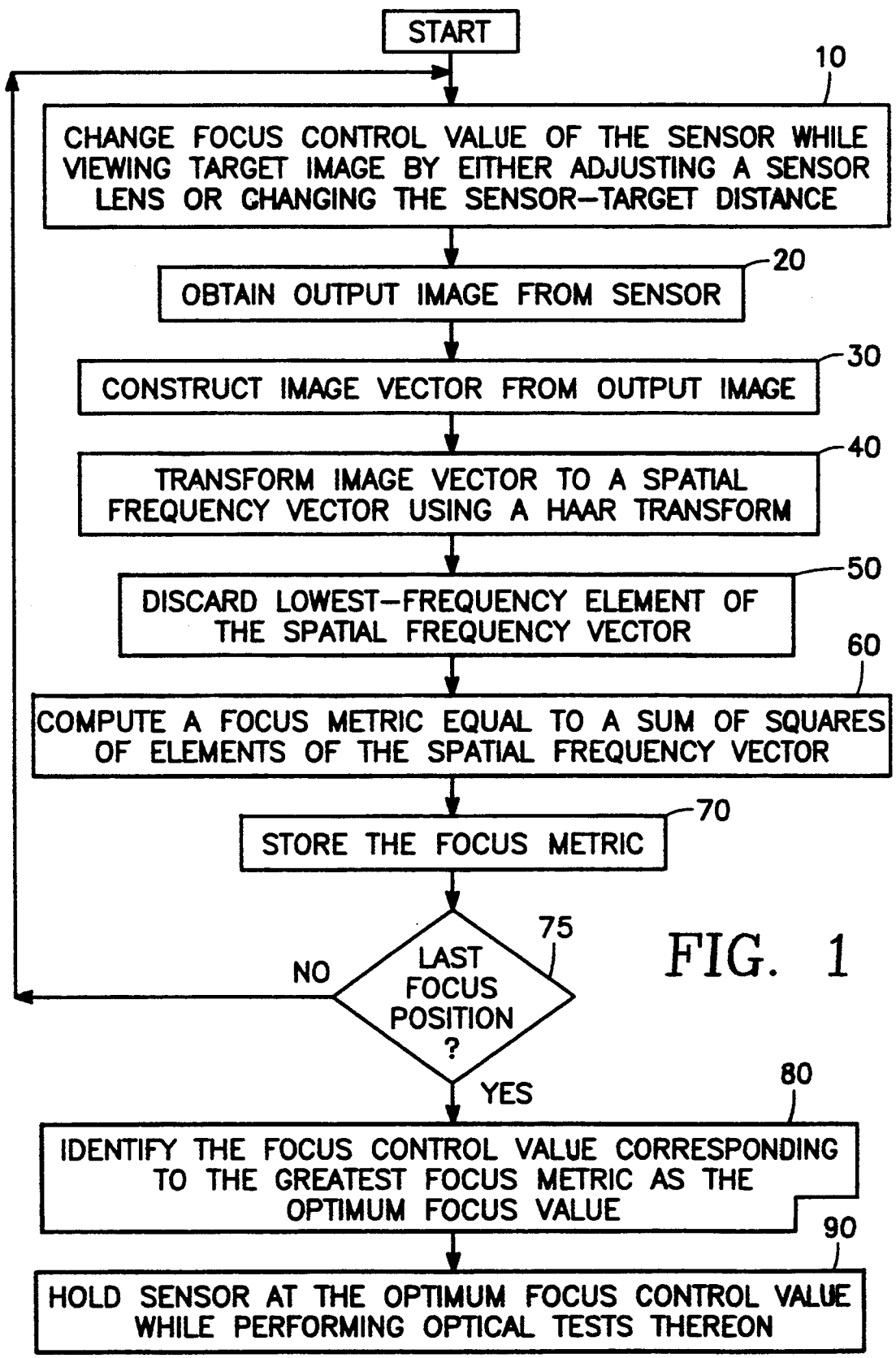

In accordance with the invention, an electro-optic sensor has within its field of view a target plane containing an image (such as a test pattern or the like). The focus of the sensor's optics is varied over a predetermined range over a predetermined period of time (block 10 of THE FIGURE). At each incremental point along the range, the output image of the electro-optic sensor is digitally recorded (block 20 of THE FIGURE). Either during or after this procedure, an image vector of pixels is formed from pixels in each recorded output image (block 30 of THE FIGURE). Each such image vector is associated with the corresponding sensor focus at which the output image was recorded. Each vector is transformed by a Haar matrix of the same dimensionality as the vector to produce a corresponding transformed vector (block 40 of THE FIGURE). Then, the zero-order (D.C.) element of the transformed vector is discarded (block 50 of THE FIGURE) and the sum of the squares of the remaining elements of the transformed vector is computed as the focusing metric (block 60 of THE FIGURE) and is then stored (block 70 of THE FIGURE). Once it is determined that the focusing metrics corresponding to an entire predetermined range of focus positions have been computed (block 75 of THE FIGURE), then all of the computed focus metrics are compared and the image having the largest focusing metric is identified as the one most in focus. The sensor focus condition prevailing when the one image was recorded is then identified as the optimum focus of the sensor (block 80) and this information is then output to the user. Then, the desired optical tests are performed on the sensor while the focus is held at the identified optimum focus position (block 90 of THE FIGURE). Such tests may include tests of parameters including dynamic range, modulation transfer function, minimum resolvable temperature difference and field of view.

In one very simplified example, there are eight pixels in each image vector taken from a respective recorded image. The image vector is therefore an eight-element vector, each element being the value of the respective pixel:

$V_1$
$V_2$
$V_3$
$V_4$
$V_5$
$V_6$
$V_7$
$V_8$

Each image vector is multiplied by an 8-by-8 Haar matrix to produce an eight-element transformed vector. The 8-by-8 Haar matrix is given as follows:

$$\begin{pmatrix} 1 & 1 & 1 & 1 & 1 & 1 & 1 & 1 \\ 1 & 1 & 1 & 1 & -1 & -1 & -1 & -1 \\ \sqrt{2} & \sqrt{2} & -\sqrt{2} & -\sqrt{2} & 0 & 0 & 0 & 0 \\ 0 & 0 & 0 & 0 & \sqrt{2} & \sqrt{2} & -\sqrt{2} & -\sqrt{2} \end{pmatrix} \times (1/\sqrt{8})$$

-continued

```
2  -2  0   0   0   0  0   0
0   0  2  -2   0   0  0   0
0   0  0   0   2  -2  0   0
0   0  0   0   0   0  2  -2
```

This multiplication produces a transformed vector whose elements are ordered in increasing spatial frequency content:

$V'_1$
$V'_2$
$V'_3$
$V'_4$
$V'_5$
$V'_6$
$V'_7$
$V'_8$

The D.C. term, $V'_1$, is discarded and the sum of the squares of the remaining terms is then computed to provide the focusing metric fm of the particular recorded image:

$$fm = V'_2{}^2 + V'_3{}^2 + V'_{404}{}^2 + V'_5{}^2 + V'_6{}^2 + V'_7{}^2 + V'_8{}^2$$

The focusing metrics thus obtained of all the recorded output images of the sensor are then compared to determine which one of all the recorded images had the greatest focusing metric. The sensor focus corresponding to the one recorded output image is then identified as the optimum one.

While the invention has been described in detail by reference to a preferred embodiment thereof, it is understood that variations and modifications thereof may be made without departing from the true spirit and scope of the invention.

What is claimed is:

1. A method of optimizing an optical focus of an electro-optical sensor in preparation for accurately measuring an optical parameter thereof of the type including, but not limited to, dynamic range, modulation transfer function, minimum resolvable temperature difference and field of view, said method comprising:

changing a focus of said sensor on a target image viewed by said sensor while obtaining successive output images produced by said sensor;

constructing respective image vectors from respective ones of said output images;

for each one of said image vectors, transforming said image vector by a transform to produce a transformed image vector of elements whose values correspond to spatial frequency content;

computing a sum of squares of the elements of each said transformed image vector to produce a corresponding focus metric; and identifying the focus of said sensor for the obtained output image corresponding to a maximum one of said produced focus metrics as being the optimized optic focus.

2. The method of claim 1 wherein said transform is a Haar matrix.

3. The method of claim 1 wherein said computing step is preceded by discarding a lowest frequency element of each said transformed image vector having a minimum spatial frequency content.

4. The method of claim 3 wherein at least one of said discarded lowest frequency elements of said transformed image vectors has a spatial frequency content of zero.

5. The method of claim 1 wherein said sensor is of a type whose focus is manually controllable, and wherein said changing said focus comprises manually adjusting said focus.

6. The method of claim 1 wherein said changing said focus on said target image comprises changing a distance between said sensor and said target image.

7. The method of claim 1 further comprising holding said sensor at said optimized optical focus while performing optical tests on said sensor.

8. The method of claim 7 wherein said optical tests include tests of parameters including at least one of: dynamic range, modulation transfer function, minimum resolvable temperature difference and field of view.

* * * * *